May 6, 1969   F. MESSERSCHMIDT   3,442,491
NEEDLE TYPE FUEL INJECTION ASSEMBLY
Filed Jan. 25, 1966
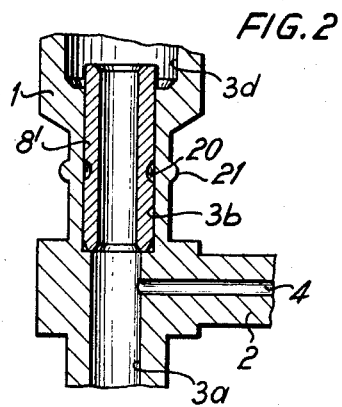
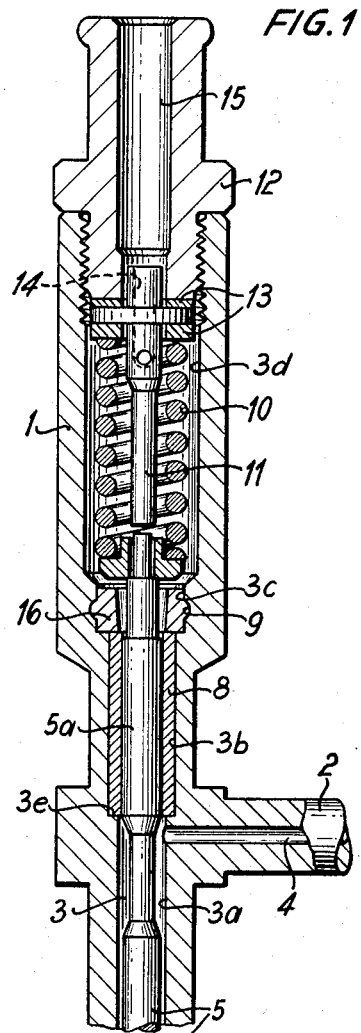
INVENTOR:
FRIEDRICH MESSERSCHMIDT
by Stephen H. Frishauf
Atty

United States Patent Office 3,442,491
Patented May 6, 1969

3,442,491
NEEDLE TYPE FUEL INJECTION ASSEMBLY
Friedrich Messerschmidt, 10 Edenkobener Strasse,
Stuttgart-Weilimdorf, Germany
Filed Jan. 25, 1966, Ser. No. 522,906
Int. Cl. F16k 1/38; F02m 61/10
U.S. Cl. 251—367                10 Claims

ABSTRACT OF THE DISCLOSURE

To provide for fuel tight assembly of guide inserts in Diesel engine injection needle valves, the inserts are formed with grooves and the valve body is then cold-flowed by swaging valve body material into the grooves; alternatively, holding bushings may be secured, fluid tight, within the valve by forming the groove in the valve body and deforming the retaining ring to provide a ring or ridge of cold-flowed metal filling the groove, whereby alignment with the bore of the needle valve body is maintained and external retaining elements are avoided.

---

The present invention relates to a needle type fuel injection assembly, and more particularly to such an assembly having an elongated stem slidable in a bushing and fitting in a separate nozzle end piece.

It has been proposed to guide a needle valve stem for injection nozzles for Diesel engine fuel injection systems in bearing portions formed in the body of the nozzle. A portion of the bearing at the same time serves to seal the valve needle, to retain it slidable in the nozzle holder, and to locate the valve needle with respect to the injection openings. Guide bushings for the elongated needles may be provided. In order to obtain smooth sliding operation of the needle stem, which may not perfectly align due to distortions occurring during hardening processes in manufacture, it has been proposed to fit these guide bushings in the nozzle holder by means of intervening plastic layers, or to secure them in self-aligning bearing elements having spherical portions. Thus, good matching of the actual shape of the valve needle element, and smooth sliding operation thereof within the nozzle is insured. Unfortunately, these expedients are quite expensive, and it is difficult to provide fluid tight guide bushing arrangements which, at the same time, adapt themselves to the shape of the needle and yet do not permit leakage of fuel under pressure.

It is an object of the present invention to provide an improved injection nozzle for fuel injection, which is simple to manufacture, provides for fluid tight seals, and is readily adaptable to needle valve stems which may not be perfectly straight and cylindrical, and which can withstand the high pressure and temperature, and temperature changes, arising in operation.

Briefly, in accordance with the present invention, a needle type fuel injection valve assembly, for example for Diesel engines, is provided in which guide means such as a guide bushing, or an injection nozzle head are formed with recesses on the outside, preferably in the form of circumferential grooves. The guide nozzle body itself is made of a softer material which is swaged or otherwise worked so that the outside material of the guide nozzle body will flow into the recesses or grooves, thus securing the guide means in the body. Preferably, the raw valve body is thickened in the region where the recesses of the inserts are located so that, when the valve body material flows into the recesses, the outer aspect of the finished body will be smooth.

For a complete discussion of the operation of such injection nozzles, and for their use in the environment of an engine, reference is hereby made to United States Government Publication TM9–8,000, 1956, and particularly chapter 76.

The structure, organization and operation of the invention will now be described more specifically in the following detailed description with reference to the accompanying drawings, in which:

FIG. 1 is a longitudinal section through a fuel nozzle assembly in accordance with the present invention;

FIG. 2 is a partial view showing a swaged-in guide bushing before securing;

FIG. 3 is a view similar to FIG. 2 after securing; and

FIG. 4 the nozzle end of the element before final securing.

Referring now to the drawings: an elongated nozzle holder body, 1, has a fuel inlet connection, 2; body 1 is formed with a central bore 3, having several offsets or shoulders. The lower portion 3a, below the fuel inlet bore 4 provides space 6 between the bore and a needle stem 5. The lower end of body 1 has an enlarged bore so that a nozzle end piece 7 may be inserted therein. Above the inlet bore 4, and within the region 3b of body 1, is a guide insert 8 for needle stem 5. The adjacent region 3c of bore 3 in body 1, is larger in order to accept a retaining ring 9. The upper portion 3d of the central bore is even larger, to receive spring 10 for the needle stem 5 and a guide spindle 11 to limit the motion of the needle stem 5. The upper region of the body 1 is closed by a screw 12. Spacer washers 13 are provided to serve as a counter bearing for spring 10. Spindle 11 itself is formed with a central bore 14, having side ports as shown in FIG. 1; the screw 12 is formed with a central bore 15. Bores 14 and 15 can be connected to the fuel pump to return fluid leaking upwardly to the fuel supply.

In order to provide a seal between valve stem 5 and the body 1, stem 5 is provided with a ground and lapped surface 5a. It fits accurately into the bushing 8, which is inserted into body 1 up to a shoulder 3e within the region 3b. The fit may be a slight press fit, or a tight sliding fit. Thereafter, retaining ring 16 is inserted into the bore 3c. Bore 3c is formed with an internal, circumferential recess or groove 9. Retaining ring 16 is then deformed, for example by pressure, such that the metal will flow, or be swaged in such a manner that it will fit into the groove 9, to provide the leakproof, tight seal against body 1. The sliding fit between needle stem 5, and particularly the accurately lapped surface 5a within bushing 8 is not affected thereby. It is noted, as seen in FIG. 1, that retaining ring 16 has an internal diameter somewhat larger than that of the stem 5. Retaining ring 16 thus serves not only to hold the bushing 8 in position, but also to provide a seal against housing 1.

The actual nozzle portion 7 has a conical valve seat 17 for a matching, conical surface 5b ground and lapped on needle 5. Injection openings 7b are arranged within the nozzle part 7, as well known in the art. The external surface of nozzle part 7, inserted into body 1, is formed with circumferential grooves 18, and is inserted into the lower portion 1a of the body 1 up to the shoulder 3f, as seen best in FIG. 4. FIG. 4 also shows a thickening, or enlargement, within the material of body 1 as seen at 19, and arranged to be opposite the circumferential grooves 18 in nozzle part 7, and approximately of the same volume. After assembly, the outside body, in the region of the thickened portion 19, is pressed or swaged in such a manner that the material of body 1 will flow into the grooves 18, forming at the same time a smooth outer surface, as seen in FIG. 1. Simultaneously, the lower end of body 1 is swaged or peened over the conical surface 7a of the insert 7 to hold it in place, as also best seen in FIG. 1. The permanent, secure, and fluid tight seat for the hardened and accurately formed part 7 is thus assured.

FIGS. 2 and 3 show a modification of the assembly of the guide bushing. A guide bushing 8' is inserted, as before, but held in place by material swaged from body 1 to flow in a groove 20 formed on the guide bushing 8'. In FIG. 2 the guide bushing has been inserted; the body is formed with a projecting welt 21, located approximately opposite the circumferential groove 20 and having approximately the same volume; the material is again subject to cold flowing in a press such that an internal welt 22 (FIG. 3) will be formed engaging groove 20.

The form of the recesses 9, 18, 20, their cross-sectional shape, their number, and their location with respect to the axis of the entire assembly can be as most convenient for the designer. Additional inserts, forming additional guide bushings, may also be provided.

The present invention provides for secure attachments of guide inserts, or nozzle inserts for a spray nozzle assembly without requiring special threading, and packing, or seats. It is only necessary to form the body with suitably arranged bores and shoulders, which can easily be done on a lathe. After placement of the inserts, the inserts can be easily secured in mechanically strong and fluid tight manner. Cold flowing metal of the nozzle holder body itself can readily be done; the guide inserts themselves are always hardened and the free movability of the needle stem is not impaired by working on the outside of the body. The grooves themselves, in their simplest manufacture, are circumferential and in a plane perpendicular to the axis of the needle valve stem.

The inserts 7, 8, or 16 can be further secured to the body by inductive welding, or brazing after the material of the body 1 has been deformed and locked into the grooves of the inserts.

What is claimed is:

1. A needle type high pressure diesel fuel injection assembly comprising a metal valve body having a bore therein; a hardened valve needle stem; metal insert means having a needle bore to receive said needle stem therein and act as liner between said stem and said body, said insert means having a surface region snugly fitting in said bore and formed with at least one preformed surface recess formed thereon; said body comprising a region of metal cold-flowed inwardly of said bore opposite said preformed recess and filling and engaging the surface recess formed on said insert means.

2. Assembly as claimed in claim 1 wherein the needle stem is elongated, a separate elongated guide bushing insert is provided to guide the elongated stem of the needle; said body being formed with an internal shoulder, and one end of said guide bushing seating against said shoulder; said bushing being formed with a circumferential groove; and the valve body being deformed so that body material is swaged into said groove of said bushing.

3. Assembly as claimed in claim 1 wherein said body is tubular, said insert means forms the valve seat and cooperates with said needle stem, and is inserted at one end of said body to close off said body; and the end of said body is deformed to partly overlap said insert means forming said valve seat to retain said valve seat in position in said body.

4. Assembly as claimed in claim 1, said body being formed with excess material of substantially the same amount as the volume of said recess in the region of said recesses whereby, upon swaging of said material into said recesses, the outside of said body will be smooth.

5. Assembly as claimed in claim 1 wherein said preformed surface recess in the insert means is a circumferential groove.

6. Assembly as claimed in claim 5 wherein a plurality of grooves are preformed at the circumference of said insert means.

7. Assembly as claimed in claim 5 wherein said groove is located in a plane perpendicular to the axis of the needle stem.

8. A needle type fuel injection assembly comprising a tubular body; a needle stem; tubular insert means within said tubular body and cooperating with the needle stem within the body; one of said insert means forming a guide bushing to guide the stem of the needle; said body being formed with an internal shoulder, one end of said guide bushing seating against said shoulder; a retaining ring bearing against the other end of said bushing; a groove preformed in the inside wall of said body in the region of the location of said retaining ring, said retaining ring being deformed outwardly to have an externally projecting ridge of cold-flowed ring material swaged into said circumferential groove formed within the wall of said body; another of said insert means forming the valve seat and being inserted at one end of said body, at least one groove formed at the circumference of said other insert means forming said valve seat; the valve body being deformed to have an internally projecting ridge of cold-flowed valve body material swaged into said groove of said insert means forming said valve seat.

9. Assembly as claimed in claim 8 wherein said other insert means forming said valve seat closes off said body and the end of said body is deformed to partly overlap said insert means forming said valve seat.

10. Assembly as claimed in claim 8, said body being formed with excess material of substantially the same amount as the volume of said groove in the region of said groove whereby, upon swaging of said material into said groove, the outside of said body will be smooth.

References Cited

UNITED STATES PATENTS

| | | | |
|---|---|---|---|
| 2,061,852 | 11/1936 | Schweitzer | 251—122 |
| 2,084,207 | 6/1937 | Lindquist et al. | 251—367 XR |
| 2,090,232 | 8/1937 | Ritz | 251—318 XR |
| 2,309,839 | 2/1943 | Gardner | 29—157.1 XR |
| 2,418,448 | 4/1947 | Arbogast | 251—359 |
| 2,572,209 | 10/1951 | Smits | 251—318 XR |
| 2,948,170 | 8/1960 | Kemp | 29—516 |
| 2,868,584 | 1/1959 | Faust | 251—318 XR |
| 3,052,444 | 9/1962 | Kintner | 251—367 XR |
| 3,068,563 | 12/1962 | Reverman | 29—516 |
| 3,358,357 | 12/1967 | Defauw | 29—516 |

SAMUEL SCOTT, Primary Examiner.

U.S. Cl. X.R.

29—157.1